Nov. 5, 1940.　　O. M. KNODE ET AL　　2,220,684

MIXER

Filed May 24, 1939　　6 Sheets-Sheet 1

INVENTOR
OLIVER M. KNODE
JOSEPH A. BESAL
FLOYD M. THORMAN
BY
ATTORNEY

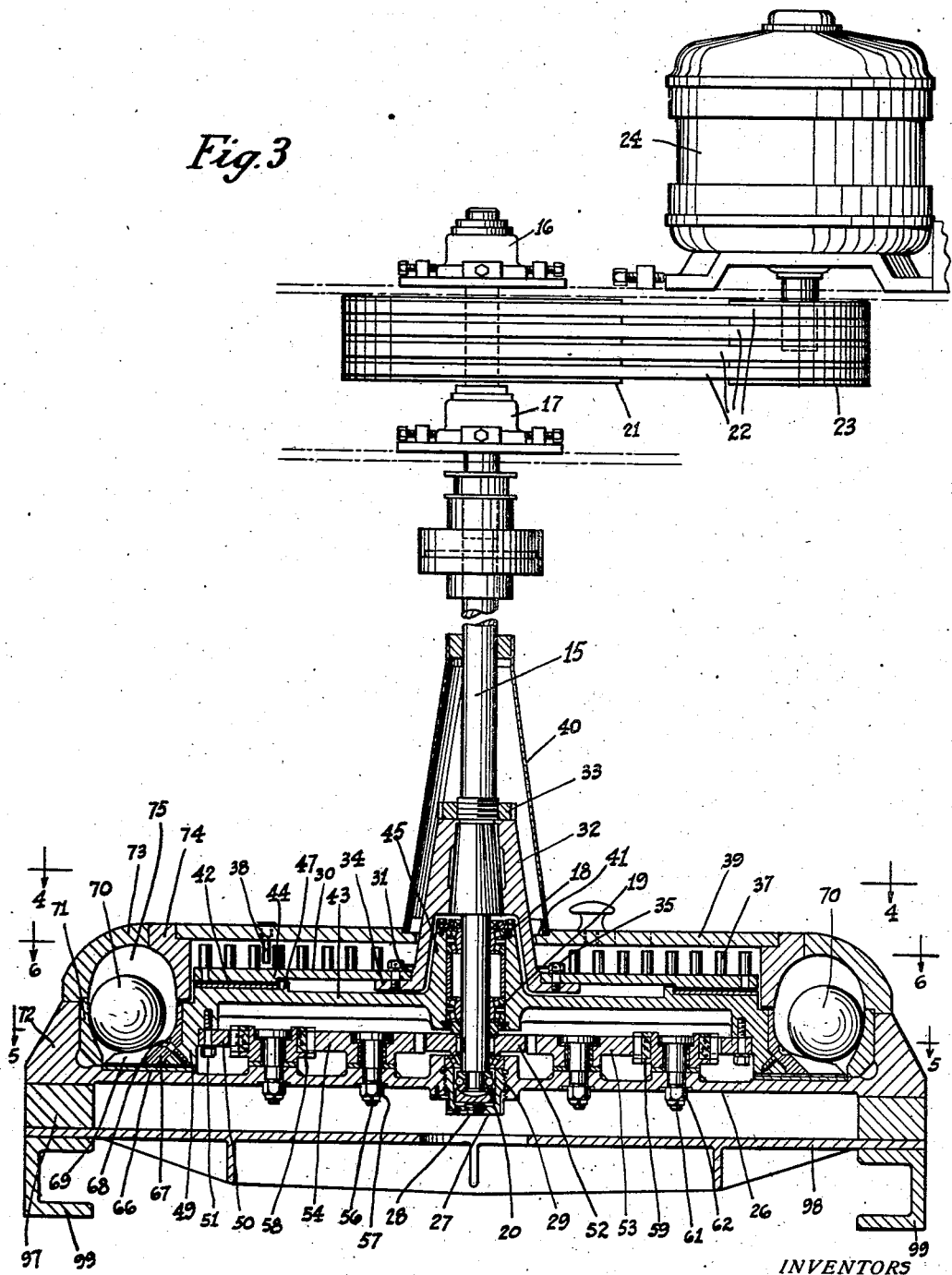

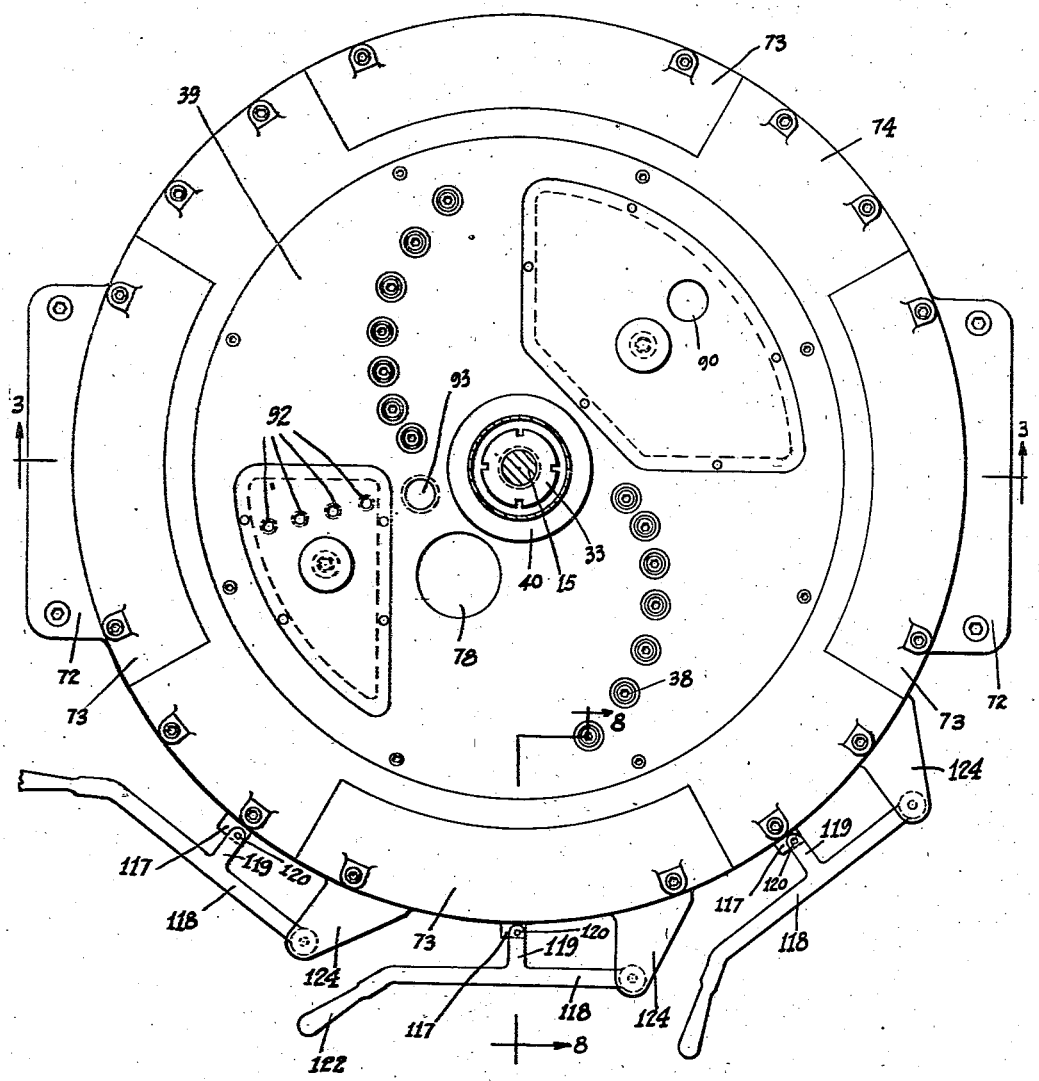

Nov. 5, 1940.    O. M. KNODE ET AL    2,220,684
MIXER
Filed May 24, 1939    6 Sheets-Sheet 5

INVENTOR
OLIVER M. KNODE
JOSEPH A. BESAL
FLOYD M. THORMAN
ATTORNEY

Nov. 5, 1940.  O. M. KNODE ET AL  2,220,684
MIXER
Filed May 24, 1939   6 Sheets-Sheet 6
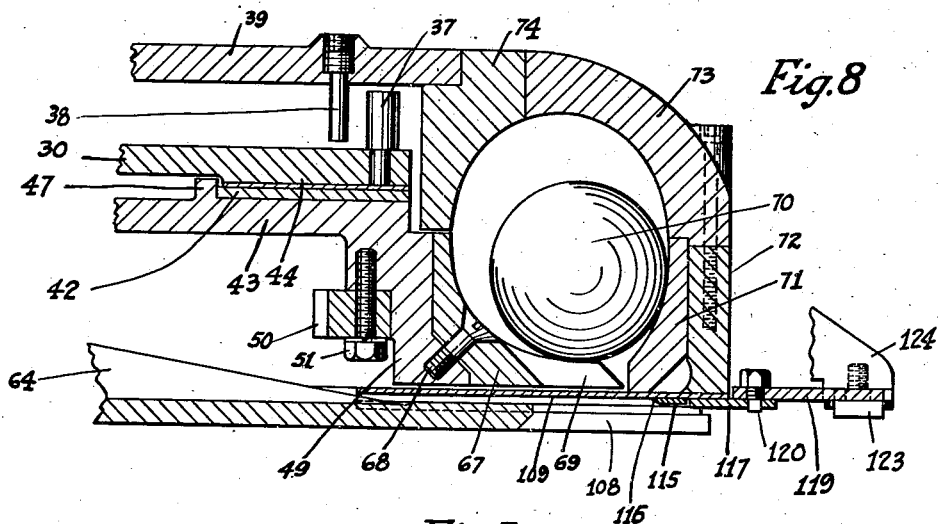
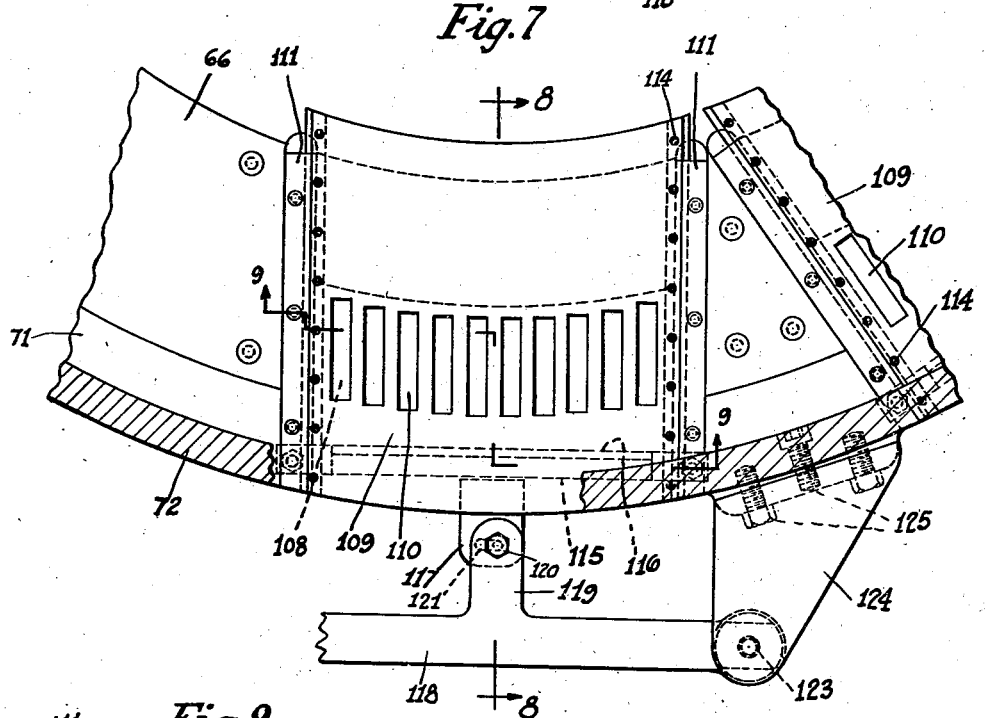
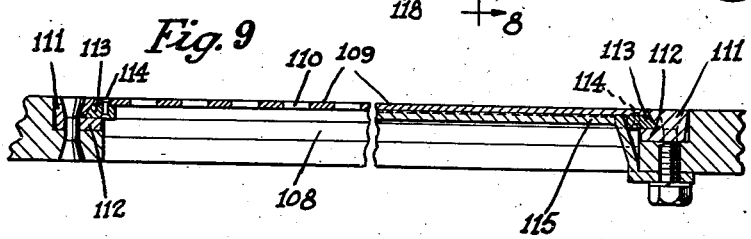
INVENTORS
OLIVER M. KNODE
JOSEPH A. BESAL
FLOYD M. THORMAN
ATTORNEY Patented Nov. 5, 1940

2,220,684

UNITED STATES PATENT OFFICE 2,220,684

MIXER

Oliver M. Knode, Winnetka, Joseph A. Besal and Floyd M. Thorman, Chicago, Ill., assignors to United States Gypsum Company, Chicago, Ill., a corporation of Illinois Application May 24, 1939, Serial No. 275,342

3 Claims. (Cl. 259—152)

This invention relates to mixers for the preparation of composite slurries containing cementitious materials, such as calcined gypsum.

In the copending application of Oliver M. Knode, Serial No. 247,232, filed December 22, 1938, a mixer and mixing method are described, and this application discloses certain improvements in the mixer and mixing method described in said application.

In the application above referred to, the mixer disclosed requires the use of two drive motors connected by a tube and inner shaft to the two mixing units. Such a mixer structure is rather expensive to construct. The cover over the outer ball race is provided with a scraper to clean off the quick setting gypsum, but this scraper is apt to be fouled with set gypsum and broken off. Furthermore the ball race of said mixer overhangs the balls around the outer periphery so that no vertical movement of the balls is permitted under the impact of the mixer teeth.

An object of this invention, therefore, is to provide a mixer which requires only one drive motor for operating both mixing units.

Another object of the invention is to provide a mixer which may be constructed at lower cost.

A further object of the invention is to provide a mixer in which no scraper is needed over the outer ball race as the cover is kept clean by vertical wiping movements of the balls.

A still further object of the invention is to provide a mixer and mixing method in which the balls move vertically through impact with the mixer teeth, thus providing a more thorough mixing action; also to improve mixers and mixing methods in other respects hereinafter specified and claimed.

Reference is to be had to the accompanying drawings forming a part of this specification, in which Fig. 1 is a side elevation of a gypsum board machine equipped with our improved mixer, Fig. 2 is a sectional elevation through the board machine taken on line 2—2 of Fig. 1, Fig. 3 is a central sectional elevation through the mixer, Fig. 4 is a sectional plan view of the mixer taken on line 4—4 of Fig. 3, Fig. 5 is a sectional plan view through the mixer with balls removed and taken on line 5—5 of Fig. 3, Fig. 6 is a sectional plan view through the mixer taken on line 6—6 of Fig. 3.

Fig. 7 is an enlarged plan view of one of the mixer discharge gates,

Fig. 8 is an enlarged sectional elevation through the mixer taken on line 8—8 of Fig. 7, and Fig. 9 is a sectional elevation through a discharge gate taken on line 9—9 of Fig. 7.

Figure 2:
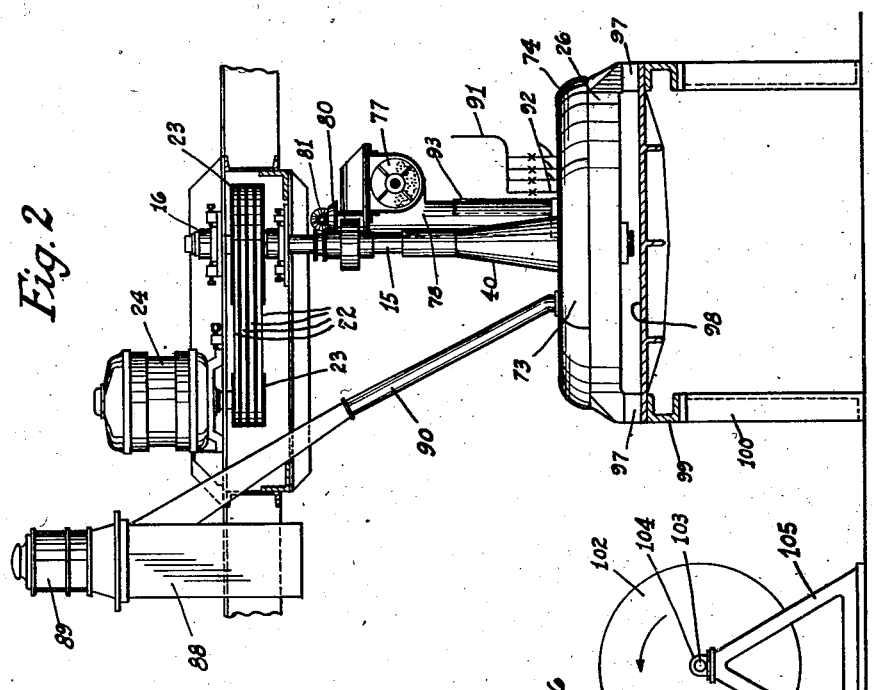
Figure 1:
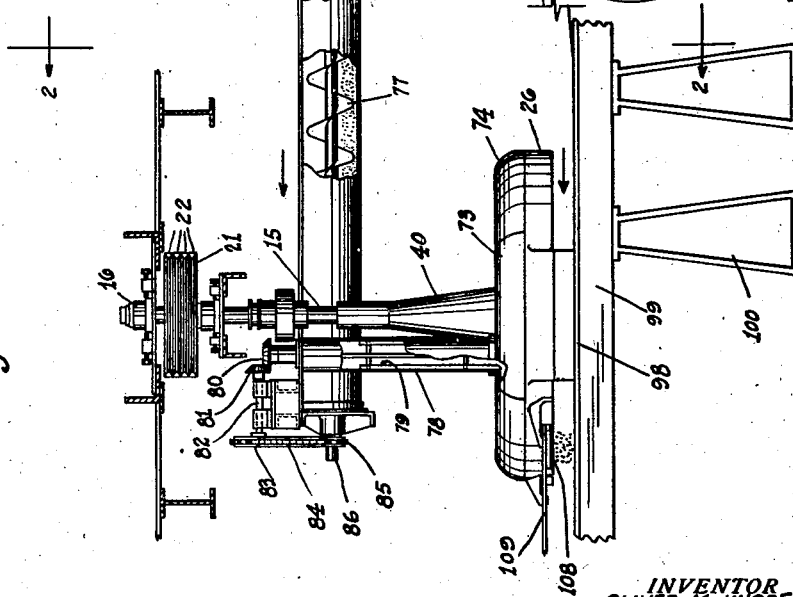

Referring to the drawings by numerals, a main drive shaft is rotatably mounted with axis vertical in suitable bearings 16, 17, 18 and 19, a thrust bearing 20 being arranged to support the bottom end of said shaft 15. A pulley 21 is secured near the upper end of shaft 15 and is connected by belts 22 to a motor pulley 23 mounted on a drive motor 24. The thrust bearing 20 is secured in the center of a mixer bowl 26 by a retainer cap 27 having a bottom plug 28 for retaining grease, said cap having threads 29 for engaging the bowl 26. A mixing rotor disc 30 is provided with a central opening 31 and a hub 32 is secured on shaft 15 by a lock nut 33, said hub 32 having an outstanding annular flange 34 to which disc 30 is secured by bolts 35. Upstanding mixing pins 37 are secured to the upper face of disc 30 and cooperate with fixed pins 38 which are secured to and extend downwardly from a mixer cover 39. A frusto-conical guard 40 extends about the shaft 15 and seats in an annular recess 41 formed in the top of cover 39. An annular wearing plate 42 is secured to the upper surface of a slow speed rotor plate 43 and a downwardly extending annular pad 44 is formed about the lower face of disc 30 to slidably engage the ring 42. An internal hub 45 on the inside of rotor plate 43 engages about the bearings 18 and 19 so that the plate 43 can rotate independently of the shaft 15 and disc 30. An annular flange 47 is formed on the upper surface of plate 43 to form a seal with the pad 44.

Figure 5:
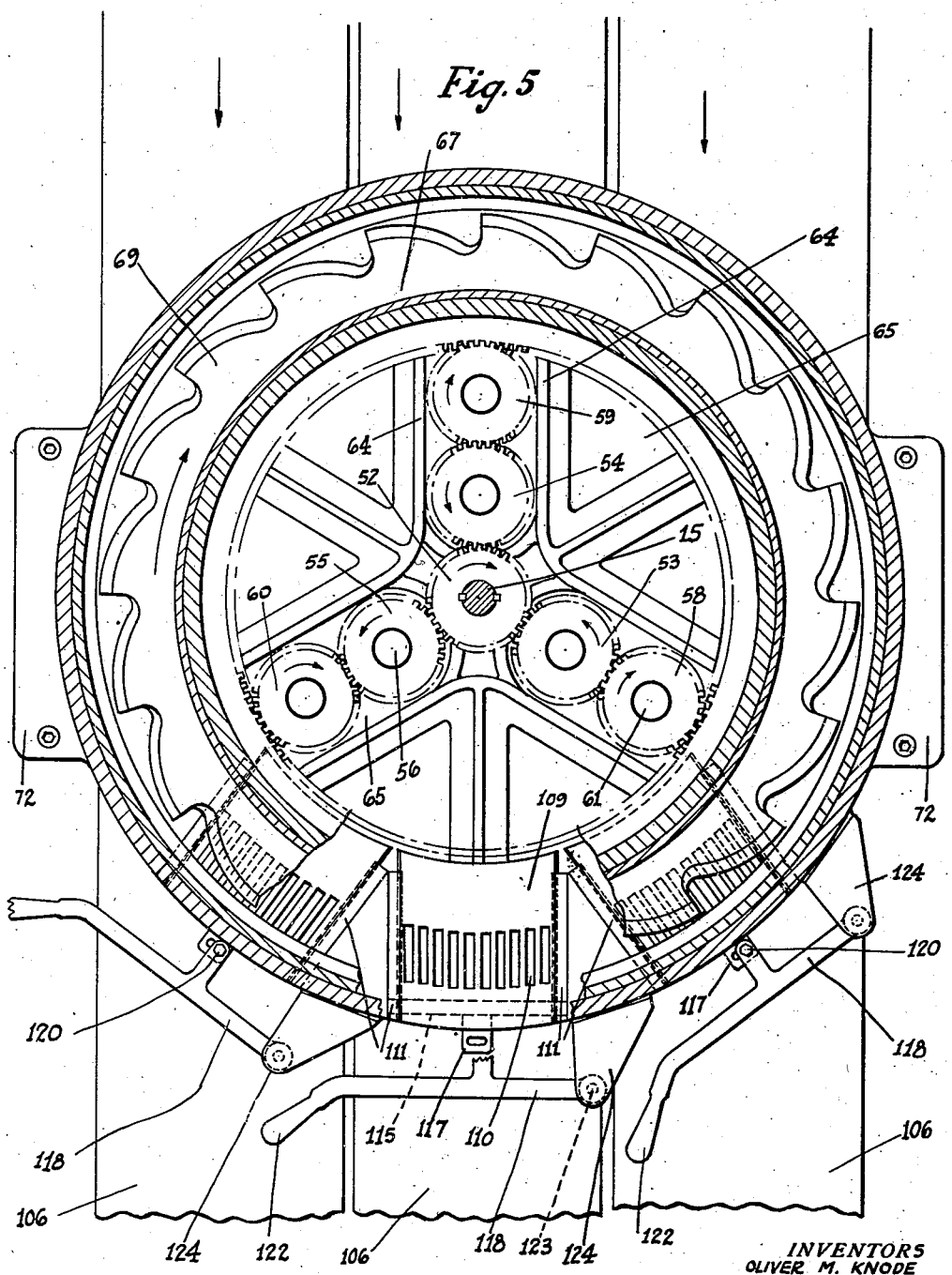
Figure 6:
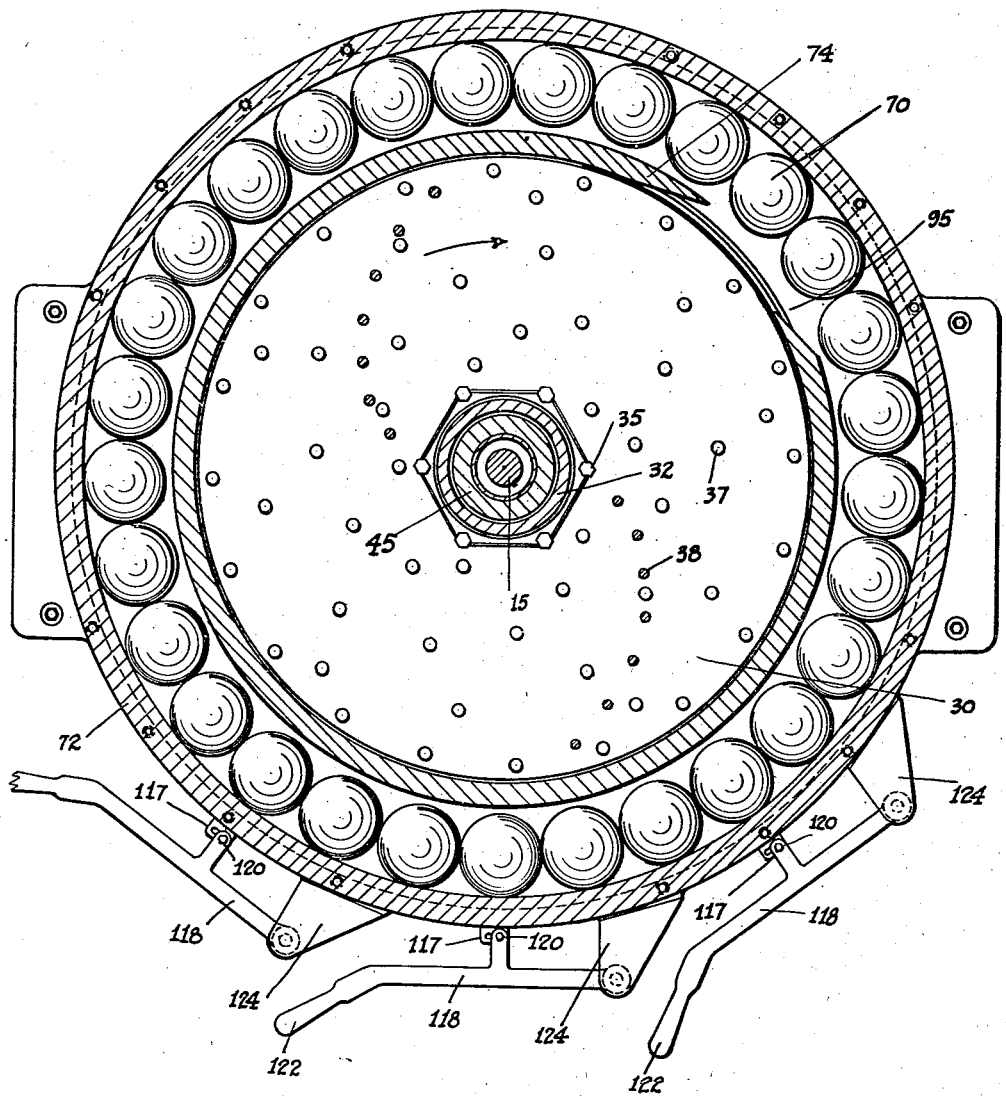

The outer periphery of rotor plate 43 is provided with a downwardly extending annular flange 49 to the inside of which an internal gear 50 is attached by bolts 51. In order to cause the rotation of rotor plate 43 from the shaft 15, a pinion 52 is secured to the shaft 15 below the hub 45. Three pinions 53, 54 and 55 are rotatably mounted on studs 56 which are secured to plate 26 by nuts 57, said pinions being arranged concentrically about the pinion 52 and meshing therewith to produce balanced forces. Three pinions 58, 59 and 60 are rotatably mounted on studs 61 which are secured to plate 26 by nuts 62, said pinions meshing with the pinions 53, 54 and 55 respectively, and with the gear 50. When the shaft 15 rotates in a clockwise direction (Fig. 5) the action of the various pinions and the gear 50 is to rotate the rotor 43 in a clockwise direction tion. Upstanding stiffening ribs 64 are formed on the plate 26 adjacent the various pinions so as to leave openings 65 between said ribs to prevent the building up of material around said pinions. A wearing plate 66 is secured to the plate 26 under the flange 49, and an annular tooth ring 67 is secured to flange 49 by screws 68. Mixing teeth 69 extend outwardly from the ring 67 and support a plurality of semi-solid rubber balls 70. An annular ball race ring 71 is secured to an annular upstanding flange 72 formed around the periphery of the plate 26, and a sectional removable annular cover 73 extends over the flange 72. An inner ring 74 is supported between covers 73 and 39, the inner surfaces of ring 74, cover 73 and ball race 71 forming a mixing space 75 which is elliptical in cross section with its major cross-sectional axis disposed vertically. The impact of the teeth 69 on balls 70 causes said balls to bounce upwardly and then inwardly to keep the inner surface of the space 75 wiped clean and preventing the formation of set gypsum on said surface without the necessity of scrapers. The bouncing of the balls also aids materially in the thorough mixing of the slurry.

In order to supply the ingredients for the slurry mixture, we provide a screw conveyor 77 which conveys calcined gypsum from a bin not shown and delivers said calcined gypsum through a pipe 78 through the cover 39. A scraper 79 rotates inside of pipe 78, being driven by bevel gears 80 and 81, the latter gear being mounted on a shaft 82 having a sprocket wheel 83 driven by chain 84 from a sprocket pinion 85 mounted on a screw conveyor shaft 86. A foam cell 88 driven by a motor 89 delivers foam through a pipe 90 through the cover 39 to a point just inside of the ring 74. Water is introduced from a manifold 91 through branch pipes 92 through the mixer cover 39. A water pipe 93 leads through the cover 39 for washing purposes. The various ingredients are mixed above the disc 30 by pins 37 and 38 and the resulting slurry is thrown through an opening 95 in the ring 74 into the chamber 75 where the balls 70 mix with foam with the slurry with a gentle mixing action insufficient to break down the bubble walls of the foam.

The mixer bowl 26 is supported by side bars 97 which in turn are supported by horizontal table 98 of a gypsum board machine having horizontal frame members 99 and vertical standards 100. When making plaster lath, it is desirable to make a plurality, such as three streams of board simultaneously for manufacturing economy. Three rolls of paper 102 are rotatably supported on a shaft 103 which in turn is supported in bearings 104 secured to brackets 105. Strips of paper 106 unwind from the rolls 102 and pass over the table 98 under the mixer bowl 26. Three discharge ports 108 are provided in the bowl bottom 26 to discharge the mixed gypsum slurry. A slide gate 109 is provided above each port to be swept clean by the teeth 69, each of said gates 109 having a series of discharge slots 110 or other shaped openings. A pair of opposed slide bars 111 are secured on the bowl bottom 26 adjacent the port 108, each of said bars having an inwardly extending dove-tail slide 112 which slidably receives the outer edges of gate 109 and a reinforcing bar 113 secured to the lower edges of said gate 109 by rivets 114. A U-shaped scraper 115 engages the lower face of each gate 109 and is provided with a knife edge 116 to scrape off set gypsum from the bottom face of each gate 109 when said gates are manually actuated. An outstanding flange 117 is secured to the outer edge of each gate 109 and a lever 118 has an outstanding arm 119 which has a pin 120 and slot 121 connection with the flange 117. One end of lever 118 is provided with an actuating handle 122 and the opposite end of said lever 118 is pivotally mounted by pin 123 to an outstanding bracket 124 secured to the bowl flange 72 by bolts 125. As the gate 109 is moved outwardly, an increasing area of the slots 110 is covered by the ring 71, and vice versa, thus controlling the volume of slurry delivered through slots 110 to the strips of paper 106.

In operation, screw conveyor 77 moves powdered calcined gypsum from the bin to a discharge pipe 78 cleaned by scraper 79. Pipe 78 delivers the calcined gypsum through mixer cover 39 onto high speed rotating disc 30 which is provided with upstanding pins 37 cooperating with stationary downstanding pins 38 secured to the bottom of cover 39. Disc 30 is rotated from shaft 15 driven by motor 24 through pulley 23, belts 22 and pulley 21. Foam is delivered from foam cell 88 through pipe 90 which passes through mixer cover 39 and delivers the foam onto upper surface of disc 30. Water for mixing with the calcined gypsum is introduced through the mixer cover 39 through manifold 91 and branch pipes 92, the latter being secured to the mixer cover 39 and depositing the water onto the upper surface of disc 30. The various ingredients are mixed by impact with the 30 rotating pins 37 and stationary pins 38, the resulting slurry being discharged through opening 95 in ring 74 into the slow speed mixing chamber 75.

A plurality of balls 70 are mounted for rotary movement in the chamber 75 and also for vertical bouncing movement caused by impact with teeth 69. The teeth 69 are mounted upon a rotary plate 43 carrying an internal gear 50, said plate 43 being supported by bearings 18 and 19 near the lower end of shaft 16. Pinion 52 secured to the shaft 15 meshes with pinions 53, 54 and 55 and these pinions in turn mesh with pinions 58, 59 and 60, the latter three pinions also meshing with internal gear 50 to cause the rotation of plate 43 as shaft 15 rotates.

The slurry mixed in the outer chamber 75 is discharged through three ports 108 which are provided with slide gates 109 having discharge slots 110. Each of the gates is operated manually by levers 118 to deposit three separate and equal streams of slurry onto the three strips of paper 106.

Our mixer is especially useful in that the outer mixer may be operated without scrapers due to the bouncing and wiping action of balls 70 on the inner surface of chamber 75. The bouncing balls also serve to more uniformly force the mixed slurry through the discharge slots 110. The mixer is operated by a single motor 24 and a single drive shaft 15 which operates both the inner high speed mixing disc 30 and the outer slow speed mixing mechanism. The mixer is comparatively low in cost and handy to operate.

We would state in conclusion that while the example illustrated constitutes a practical embodiment of our invention, we do not wish to limit ourselves precisely to these details, since manifestly the same may be considerably varied without departing from the spirit of the invention as defined in the appended claims.

Having thus described our invention, we claim as new and desire to secure by Letters Patent:

1. In a mixing device suitable for preparing gypsum slurry, a driven shaft arranged with axis substantially vertical, a mixing disc secured to said shaft, a housing enclosing said disc, means for introducing calcined gypsum, or the like, onto said disc to be mixed and thrown outwardly, an annular ball chamber outside of and concentric with said disc to receive the slurry from said disc, resilient balls in said chamber, a toothed wheel mounted for rotation in said chamber, said teeth being arranged to cause said balls to bounce and revolve in said chamber to accomplish a further mixing of said slurry and the cleaning of the inside surface of said chamber, and means for discharging the slurry from said chamber.

2. In a mixing device suitable for preparing gypsum slurry, a vertically arranged drive shaft, a mixing disc secured to said shaft, a housing enclosing said disc, means for depositing calcined gypsum or the like and water onto said disc near the center of rotation thereof to be mixed and thrown outwardly, an annular mixing element mounted for rotation concentrically about and independently of said disc, a ring gear secured to and arranged concentrically of said annular mixing element, a drive pinion secured to said shaft, a plurality of driven pinions meshing with and equally spaced circumferentially of said ring gear, and a plurality of idler pinions equally spaced circumferentially of the drive pinion and meshing therewith and with said driven pinions to cause the rotation of said annular mixing element from said shaft.

3. In a mixing device, a vertically arranged drive shaft, a closed annular ball chamber concentric with said shaft, said chamber being substantially elliptical in cross section with its major cross-sectional axis disposed vertically, means for introducing a calcined gypsum slurry into said chamber, a plurality of balls in said chamber, means operated from said shaft for causing said balls to rotate and to bounce along the major cross-sectional axis of said chamber so as to accomplish a mixing of said slurry and a cleaning of the inside surface of said chamber, and means for discharging the mixed slurry from said chamber.

OLIVER M. KNODE.
JOSEPH A. BESAL.
FLOYD M. THORMAN.